United States Patent
Moen

(10) Patent No.: US 10,493,798 B2
(45) Date of Patent: Dec. 3, 2019

(54) AIR STRUT SUSPENSION SYSTEM FOR A SELF-PROPELLED HIGH GROUND CLEARANCE PRODUCT APPLICATOR

(71) Applicant: CNH Industrial America LLC, New Holland, PA (US)

(72) Inventor: Richard A. Moen, Glenwood, MN (US)

(73) Assignee: CNH Industrial America LLC, New Holland, PA (US)

(*) Notice: Subject to any disclaimer, the term of this patent is extended or adjusted under 35 U.S.C. 154(b) by 231 days.

(21) Appl. No.: 15/468,403

(22) Filed: Mar. 24, 2017

(65) Prior Publication Data

US 2018/0272826 A1    Sep. 27, 2018

(51) Int. Cl.
| | | |
|---|---|---|
| B60B 19/00 | (2006.01) | |
| B60G 17/015 | (2006.01) | |
| B60G 11/27 | (2006.01) | |
| B60G 3/12 | (2006.01) | |
| A01B 63/00 | (2006.01) | |
| B60B 19/14 | (2006.01) | |
| A01M 7/00 | (2006.01) | |
| B60G 17/019 | (2006.01) | |
| A01B 51/02 | (2006.01) | |

(52) U.S. Cl.
CPC .......... *B60B 19/003* (2013.01); *A01B 51/026* (2013.01); *A01B 63/002* (2013.01); *A01B 63/008* (2013.01); *A01M 7/0082* (2013.01); *B60B 19/14* (2013.01); *B60G 3/12* (2013.01); *B60G 11/27* (2013.01); *B60G 17/019* (2013.01); *B60G 17/0155* (2013.01); *B60G 2300/08* (2013.01); *B60G 2300/083* (2013.01); *B60G 2300/37* (2013.01); *B60G 2400/252* (2013.01); *B60G 2400/95* (2013.01); *B60G 2500/30* (2013.01)

(58) Field of Classification Search
CPC ................................ A01B 63/008; B60G 3/12
See application file for complete search history.

(56) References Cited

U.S. PATENT DOCUMENTS

| | | | |
|---|---|---|---|
| 4,981,309 A | 1/1991 | Froeschle et al. | |
| 5,499,683 A | 3/1996 | Bassett | |
| 5,588,665 A * | 12/1996 | Pierce | B60G 9/02 |
| | | | 180/209 |
| 5,597,172 A | 1/1997 | Maiwald et al. | |
| 6,386,554 B1 | 5/2002 | Weddle | |
| 6,460,872 B2 | 10/2002 | Cadden | |

(Continued)

*Primary Examiner* — Nicole T Verley
(74) *Attorney, Agent, or Firm* — Rebecca L. Henkel; Rickard K. DeMille

(57) ABSTRACT

A system, apparatus and method for controlling the height of a frame of a self-propelled high ground clearance, agricultural product applicator above a ground surface utilize a trailing link suspension system including an extensible air strut, for connecting ground engaging wheels of the applicator to the frame of the applicator. The trailing arm suspension system includes an upper suspension arm attached to the frame, a lower suspension arm providing sole support of a ground engaging wheel attached to the lower arm, and the extensible air strut interconnected between the upper and lower arms. Height of the applicator above the ground surface is controlled by regulating a flow of pressurized air to the air strut, to thereby control extension of the air strut.

19 Claims, 5 Drawing Sheets

(56) References Cited

U.S. PATENT DOCUMENTS

| | | | |
|---|---|---|---|
| 6,594,980 B2 * | 7/2003 | Oka | A01D 34/661 56/15.8 |
| 6,808,035 B1 | 10/2004 | Keeler | |
| 6,857,647 B2 | 2/2005 | Johnsman et al. | |
| 6,942,232 B1 * | 9/2005 | McGhie | B60G 5/04 280/124.111 |
| 7,159,888 B1 * | 1/2007 | Sutton | B60P 3/40 280/406.1 |
| 7,178,817 B1 | 2/2007 | Welles et al. | |
| 7,192,033 B2 | 3/2007 | Bolt et al. | |
| 7,306,239 B2 | 12/2007 | Schutt et al. | |
| 8,297,634 B2 | 10/2012 | Bittner | |
| 8,424,897 B1 * | 4/2013 | Sutton | B60G 3/06 180/14.1 |
| 8,523,191 B2 | 9/2013 | Yagiela | |
| 8,602,430 B2 | 12/2013 | Subbarayalu | |
| 8,641,051 B2 | 2/2014 | Pavuk et al. | |
| 8,678,408 B2 * | 3/2014 | Kobayashi | B60G 9/02 180/22 |
| 8,708,359 B2 | 4/2014 | Murray | |
| 8,827,292 B2 | 9/2014 | Batsch et al. | |
| 8,915,507 B2 | 12/2014 | Helm | |
| 9,187,123 B2 * | 11/2015 | Sutton | B60G 3/06 |
| 9,511,644 B2 | 12/2016 | Tollefsrud et al. | |
| 9,688,113 B2 * | 6/2017 | Ruppert | B60G 17/0525 |
| 2012/0112437 A1 | 5/2012 | Simard | |
| 2015/0273972 A1 | 10/2015 | Plath | |
| 2015/0293972 A1 | 10/2015 | Plath | |
| 2018/0272824 A1 * | 9/2018 | Kerner | B60G 17/0155 |

* cited by examiner

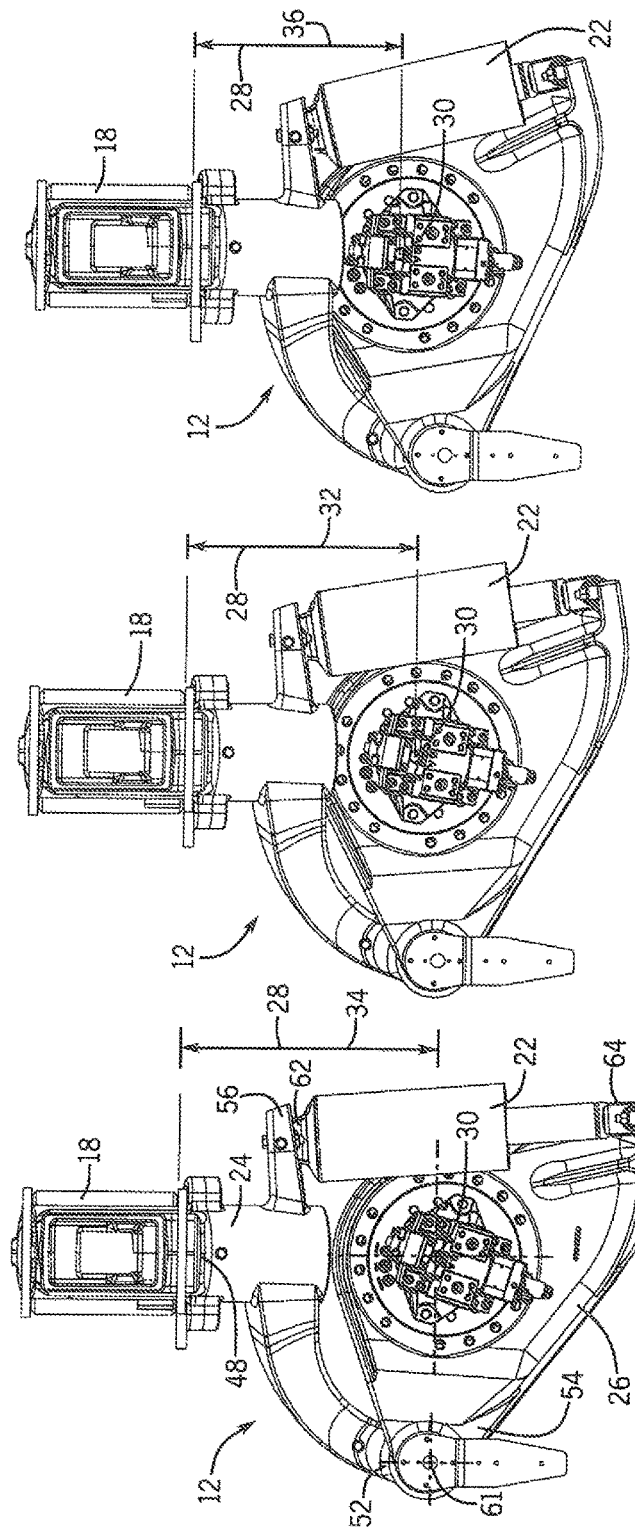

AIR STRUT SUSPENSION SYSTEM FOR A SELF-PROPELLED HIGH GROUND CLEARANCE PRODUCT APPLICATOR

FIELD OF THE INVENTION

This invention relates generally to a self-propelled agricultural product application implement, such as a high-clearance sprayer and/or spreader, and more particularly to a suspension system for such implements.

BACKGROUND OF THE INVENTION

Modern agricultural practices rely heavily on precise and timely applications of fertilizers, herbicides, pesticides and other chemicals. In situations where the applications must be made to standing row crops, such as corn or beans, liquid or granular materials are often applied using a high ground clearance, self-propelled applicator.

In order to provide maximum ground clearance, such applicators utilize highly specialized suspension systems for connecting the ground engaging wheels of the applicator to a frame of the applicator. Typically, separate hydraulic drive motors are provided as part of the suspension, for each drive wheel, to thereby further enhance ground clearance by minimizing the encroachment of drive line or typical suspension components into the space between the wheels under the applicator.

In the past, suspension systems for high ground clearance, self-propelled applicators utilized suspension components, including compression springs and hydraulic shock absorbers, that were essentially the same as those used in automotive and commercial vehicle suspensions. While these components have generally worked well in the specialized suspension systems of high ground clearance, self-propelled applicators, they are not ideal and further improvement is desirable.

One problem with prior high clearance applicator suspension systems, is that the ground clearance tends to vary depending upon how heavily the applicator is loaded. Initially, as it pulls away from a tender with a full load, an applicator is typically carrying several thousand pounds of a product to be applied. As the product is dispensed onto the field by the applicator, the weight of the remaining product being carried by the applicator gradually decreases to zero. With prior suspensions that rely on compression springs for supporting the load carried by the applicator, ground clearance starts out at a minimum when the applicator is initially fully loaded, with the springs compressed to their lowest working height. As product is dispensed and load on the applicator decreases, the compression springs extend from their initially compressed state, and raise the applicator higher above the ground surface.

Having ground clearance vary is undesirable for at least two reasons. First, the effectiveness of the product being applied is highly dependent upon precise application. As ground clearance changes, spray or granular spreading patterns may be adversely affected, requiring continual compensating adjustments to be made by an operator of the applicator, in order to maintain optimal product application. Second, ride quality and handling characteristics of the applicator are typically affected by ground clearance, and the state of extension of the compression springs. The springs, and hence the suspension, is considerably stiffer when the springs are more fully compressed than when they are extended.

Prior suspension systems using compression springs are also typically optimized for one type of operating mode. This results in compromising suspension performance in other operating modes that are typically necessary in practical utilization of the applicator. For example, it is necessary to drive the applicator across the field in an unloaded state, to and from the tender, in addition to driving the vehicle across the field in a fully or partially loaded state while applying product to the field. It will likely be necessary for the applicator to travel on public roads, at times, in moving between fields. Differences in handling characteristics inherent in spring-based suspension systems, from loaded to unloaded states of the applicator, may make such on-road transit more difficult. It may be necessary to transport the applicator on a truck or trailer between fields. This can present additional problems for high ground clearance applicators, in that the overall combined height of the applicator and the bed of the trailer or vehicle carrying the applicator may exceed applicable limits for transport on public roads.

It is desirable, therefore, to provide an improved suspension system for self-propelled, high ground clearance, agricultural product applicators. It is particularly desirable to provide such an improved suspension system that can set and maintain a desired ground clearance, and provide desirable ride and handling characteristics in a self-propelled, high ground clearance, agricultural product applicator throughout a wide range of operating modes and conditions.

SUMMARY OF THE INVENTION

The invention provides a system, apparatus and method for controlling the height of a frame of a self-propelled agricultural product applicator above a ground surface, by using a trailing link suspension system including an extensible air strut for connecting ground engaging wheels of the applicator to the frame of the applicator. The trailing arm suspension system includes an upper suspension arm attached to the frame and a lower suspension arm providing sole support of a ground engaging wheel attached to the lower arm. The extensible air strut is interconnected between the upper and lower arms in such a manner that the height of the applicator above the ground surface may be controlled by regulating a flow of pressurized air to the air strut, to thereby control extension of the air strut and vertical distance between a rolling axis of the wheel and the frame of the applicator.

In one form of the invention, a trailing-arm suspension system is provided, for operatively connecting a ground engaging wheel to a frame of a self-propelled agricultural product applicator. The frame of the applicator is adapted for supporting at least one product container. The frame defines forward and rear ends of the frame, a longitudinally extending central axis of the frame extending from the rear to the front of the frame in a direction of travel of the applicator, and a vertical axis of the frame. The suspension system may include, a lower suspension arm, an upper suspension arm, and an air strut that are operatively interconnected to one another and disposed between the ground engaging wheel and the frame, for supporting the applicator above a ground surface.

The upper suspension arm defines a frame attachment point of the upper suspension arm, that is adapted for fixed attachment to the frame. The lower suspension arm defines a rolling axis of the ground engaging wheel, and is adapted for supportive attachment thereto of the ground engaging wheel for rotation of the ground engaging wheel about the rolling axis of the wheel. The upper and lower suspension arms also define respective forward and aft ends of the suspension arms, with the forward ends being joined to one another in a pivoting connection, for pivoting movement of the lower arm with respect to the upper arm about a suspension pivot axis that extends generally parallel to the rolling axis of the wheel and is located forward of the rolling axis of the wheel. The aft ends of the upper and lower suspension arms are located respectively aft of the frame attachment point and rolling axis, and are respectively adapted for connection to upper and lower ends of the air strut.

The air strut may have an upper end thereof adapted for operative attachment to the aft end of the upper suspension arm, and may also have a lower end, of the air strut, adapted for operative attachment to the aft end of the lower suspension arm. The air strut may be configured for receiving a flow of pressurized air from an air power source, and for extending and retracting in response to the flow of pressurized air, to thereby respectively lower and raise the rolling axis of the wheel with respect to the frame attachment point. The air strut includes an air cylinder and piston arrangement with rigid walls that do not flex like elastomeric air springs. In some forms of the invention, the air strut may include a shock absorber.

In some forms of the invention, the upper suspension arm may be rigid, and configured to not articulate vertically with respect to the frame, with the forward end of the upper suspension arm being located both forward of and below the frame attachment point.

In some forms of the invention, the suspension system may provide sole support for the ground engaging wheel attached to the lower arm of the suspension system. Some forms of a suspension system, according to the invention, may further include a hydraulic motor drive unit operatively attaching the wheel to the lower suspension arm.

Some forms of a trailing-link suspension system, according to the invention, may further include an electronic control unit that is operatively connected and configured for controlling the flow of pressurized air to the air strut from the air power source, to thereby control extension and retraction of the air strut. An electronic control unit, according to the invention, may also be configured to receive an input signal indicative of a desired height of the frame of the applicator above a ground surface beneath the applicator, and for controlling the air power source in a manner causing the air strut and suspension to support the frame at the desired height.

The invention may also take the form of a self-propelled agricultural product applicator, having at least one ground engaging wheel operatively connected to a frame by a trailing-arm suspension system in accordance the invention. Some forms of a self-propelled agricultural product applicator, according to the invention, may have two or more ground engaging wheels, each operatively attached to the frame by individual trailing arm suspension systems according to the invention.

A self-propelled agricultural product applicator having two or more ground engaging wheels each operatively attached to the frame by individual trailing arm suspension systems according to the invention, may also include an electronic control unit operatively connected for controlling the flow of pressurized air to the air struts of the suspension systems of the two, or more, ground engaging wheels from the air power source, to thereby control extension and retraction of the air struts. In some forms of the invention, an electronic control unit may be configured to receive an input signal indicative of a desired height of the frame of the applicator above a ground surface beneath the applicator, and for controlling the air power source in a manner causing the air struts of the suspension systems of the two, or more, ground engaging wheels to support the frame of the applicator at the desired height.

The invention may also take the form of a method for controlling the height of a frame of a self-propelled agricultural product applicator above a ground surface, by connecting the frame to a ground supporting wheel of the applicator using a trailing link suspension system including an upper suspension arm attached to the frame, a lower suspension arm providing sole support of a ground engaging wheel attached thereto, and an extensible air strut operatively interconnected between the upper and lower arms, and controlling a flow of pressurized air to the air strut, to thereby control extension of the air strut and height of the applicator frame above the ground surface.

A method, according to the invention, may also include connecting two or more ground engaging wheels of the applicator to the frame using individual trailing link suspension systems, each including an upper suspension arm attached to the frame, a lower suspension arm providing sole support of a ground engaging wheel attached thereto, and an extensible air strut operatively interconnected between the upper and lower arms, and controlling a flow of pressurized air to the air struts of the suspension systems, to thereby control respective extension of the air struts and height of the applicator frame above the ground surface.

In various forms of a method according to the invention, the upper suspension arm may define a frame attachment point thereof, adapted for fixed attachment to the frame. The lower suspension arm may define a rolling axis of the ground engaging wheel, and be adapted for supportive attachment thereto of the ground engaging wheel for rotation of the ground engaging wheel about the rolling axis of the wheel. The upper and lower suspension arms may also define respective forward and aft ends thereof, with the forward ends being adapted for operative pivoting connection to one another about a suspension pivot axis extending generally parallel to the rolling axis of the wheel and disposed forward of the rolling axis of the wheel. The aft ends of the upper and lower suspension arms may be disposed respectively aft of the frame attachment point and the rolling axis, with the aft ends of the upper and lower suspension arms being respectively adapted for operative attachment thereto of the air strut. The air strut may have an upper end thereof adapted for operative attachment to the aft end of the upper suspension arm, and may also have a lower end thereof adapted for operative attachment to the aft end of the lower suspension arm. The air strut may be configured for receiving a flow of pressurized air from an air power source, and for extending and retracting in response to the flow of pressurized air, to thereby respectively lower and raise the rolling axis of the wheel with respect to the frame attachment point.

Other aspects, objects and advantages of the invention will be apparent from the following detailed description and accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 5-7 are orthographic illustrations of the suspension system of FIG. 4, showing the suspension system respectively in maximum height, working height, and minimum height positions.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE EXEMPLARY EMBODIMENTS

Figure 1:
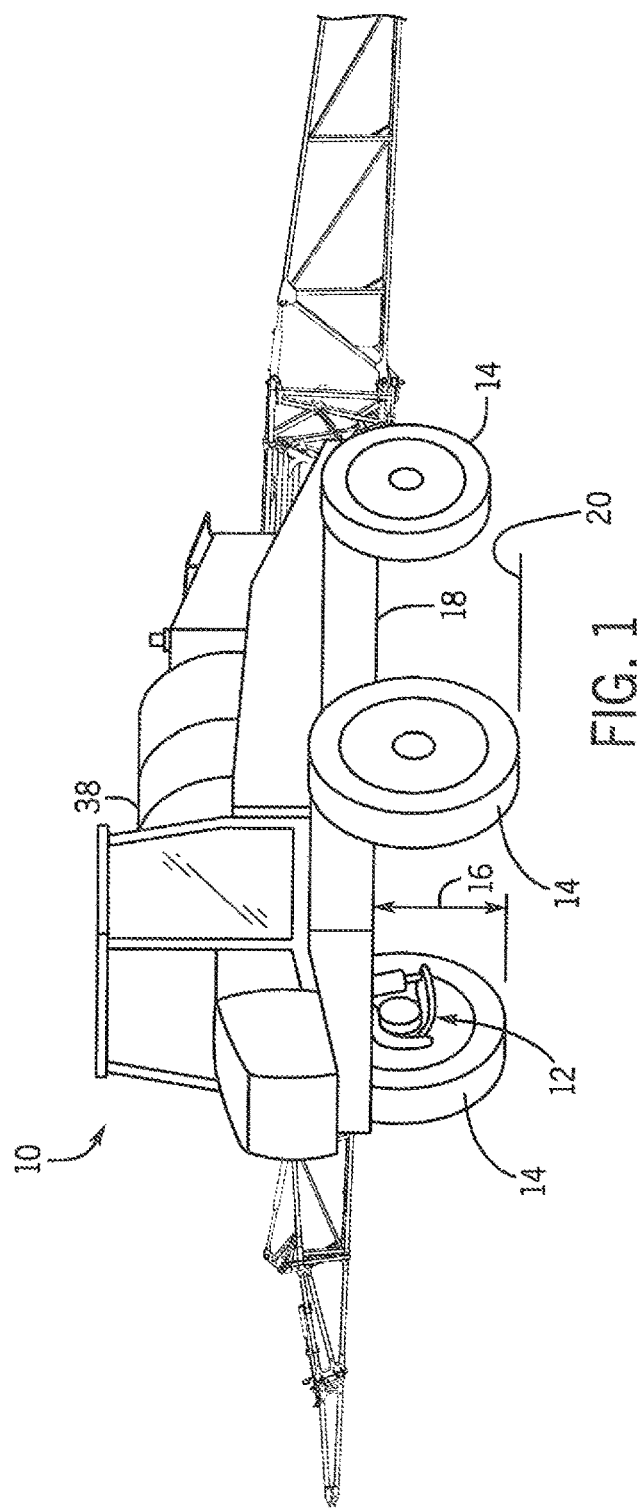
FIG. 1 is a perspective illustration of an exemplary embodiment of a self-propelled, high ground clearance, agricultural applicator, according to the invention.
Figure 2:
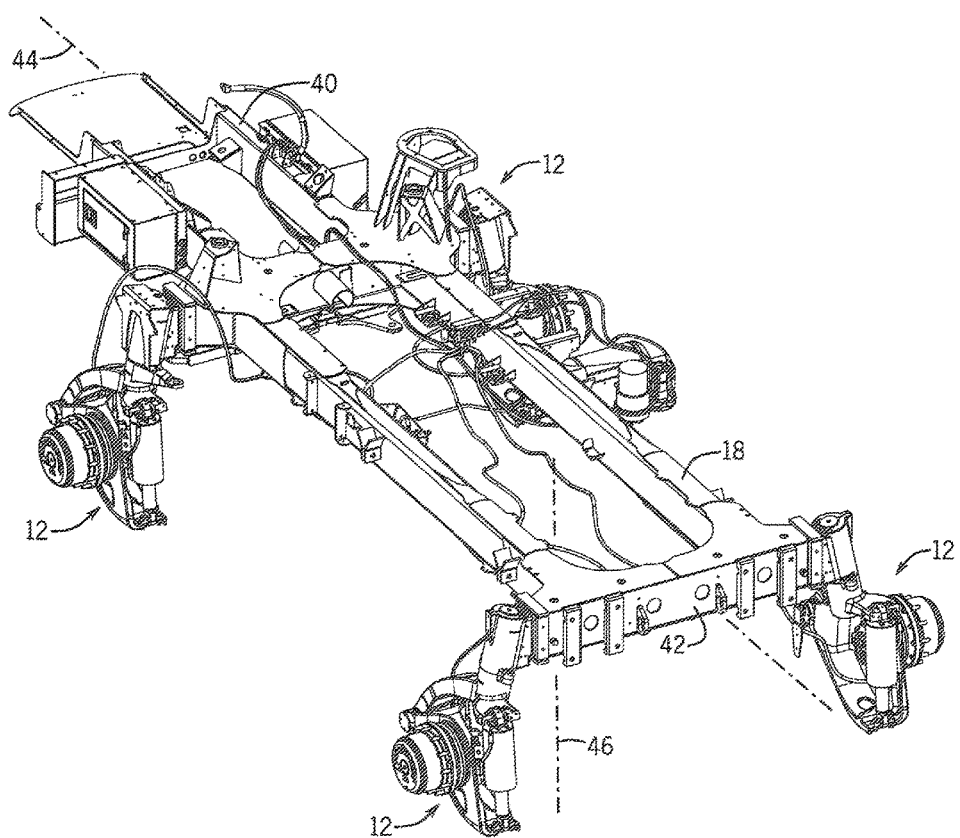
FIG. 2 is a perspective illustration of a frame and suspension systems of the exemplary embodiment of the applicator of FIG. 1.

FIG. 1 shows an exemplary embodiment of the invention in the form of a high ground clearance, self-propelled, agricultural product applicator 10, that includes improved suspension systems 12, according to the invention, for each of the four ground engaging wheels 14 of the applicator 10.

As shown in FIGS. 1-4, and described in more detail below, the invention provides a system, apparatus and method for controlling the height 16 of a frame 18 of a self-propelled agricultural product applicator 10 above a ground surface 20, by using a trailing link suspension system 12 that has an extensible air strut 22, for connecting each of the four ground engaging wheels 14 of the applicator 10 to the frame 18 of the applicator 10. The trailing arm suspension systems 12 each include an upper suspension arm 24 attached to the frame 18, and a lower suspension arm 26 that provides sole support of a ground engaging wheel 14 attached to the lower arm 26, in a manner described in more detail below.

As illustrated in FIGS. 4-7, the extensible air strut 22 is interconnected between the upper and lower arms 24, 26 in such a manner that the height 16 of the applicator 10 above the ground surface 20 may be controlled by regulating a flow of pressurized air to the air strut 22, to thereby control extension of the air strut 22 and a vertical distance 28 between a rolling axis 30 of the wheel 14 and the frame 18 of the applicator 10. As shown in FIGS. 5-7, by controlling the flow of pressurized air to the strut 22, the suspension can be positioned and held at desired working height position 32, as shown in FIG. 6, or any other height position between a highest position 34, shown in FIG. 5, and a lowest height position 36, as shown in FIG. 7. Specifically, to raise the applicator frame 18 to a maximum height 16 above the ground surface 20, a flow of pressurized air is supplied the air strut 22 that is sufficient to cause the air strut 22 to extend to its maximum length 34, as illustrated in FIG. 5. To lower the applicator frame 18 to its minimum height 16 above the ground surface 20, pressurized air is allowed to flow out of the air strut 22, so that the air strut 22 can retract to its minimum length 36, as shown in FIG. 7. By regulating the flow of pressurized air to the air strut 22, the suspension 12 can adjust the length of the air strut 22, and hold the frame 18 of the applicator at any desired working height 16 by holding extension of the air strut 22 at a corresponding length within the operative stroke length of the air strut 22.

Returning to FIGS. 1 and 2, the frame 18 of the applicator 10 is adapted for supporting at least one product container 38 and defines forward and rear ends 40, 42 of the frame 18, a longitudinally extending central axis 44 of the frame extending from the rear end 42 to the front end 40 of the frame 18, in a direction of travel of the applicator 10, and vertical axis 46 of the frame 18.

Figure 3:
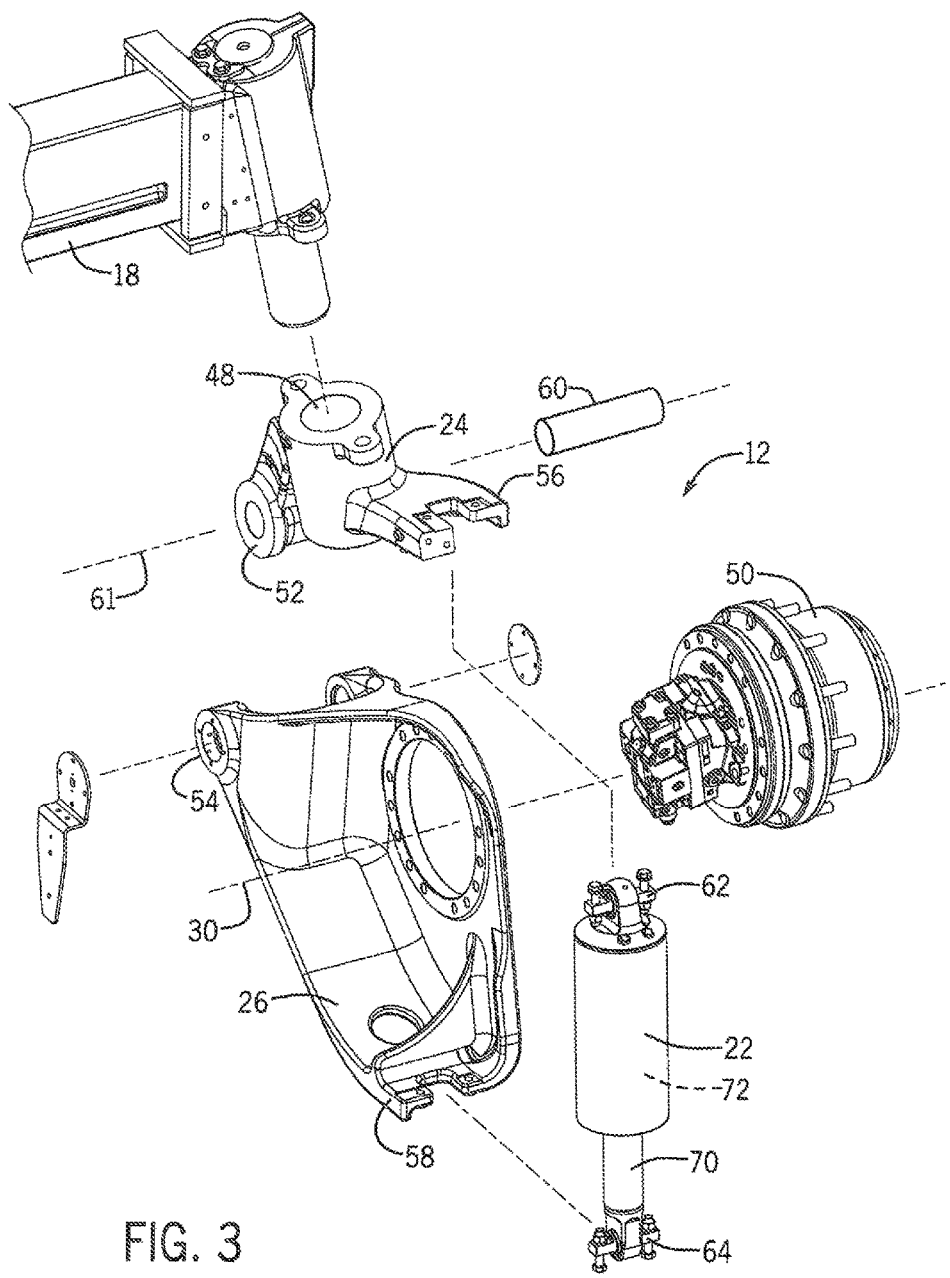
FIG. 3 is an exploded perspective illustration of a suspension system of the exemplary embodiment of the applicator shown in FIG. 1.
Figure 4:
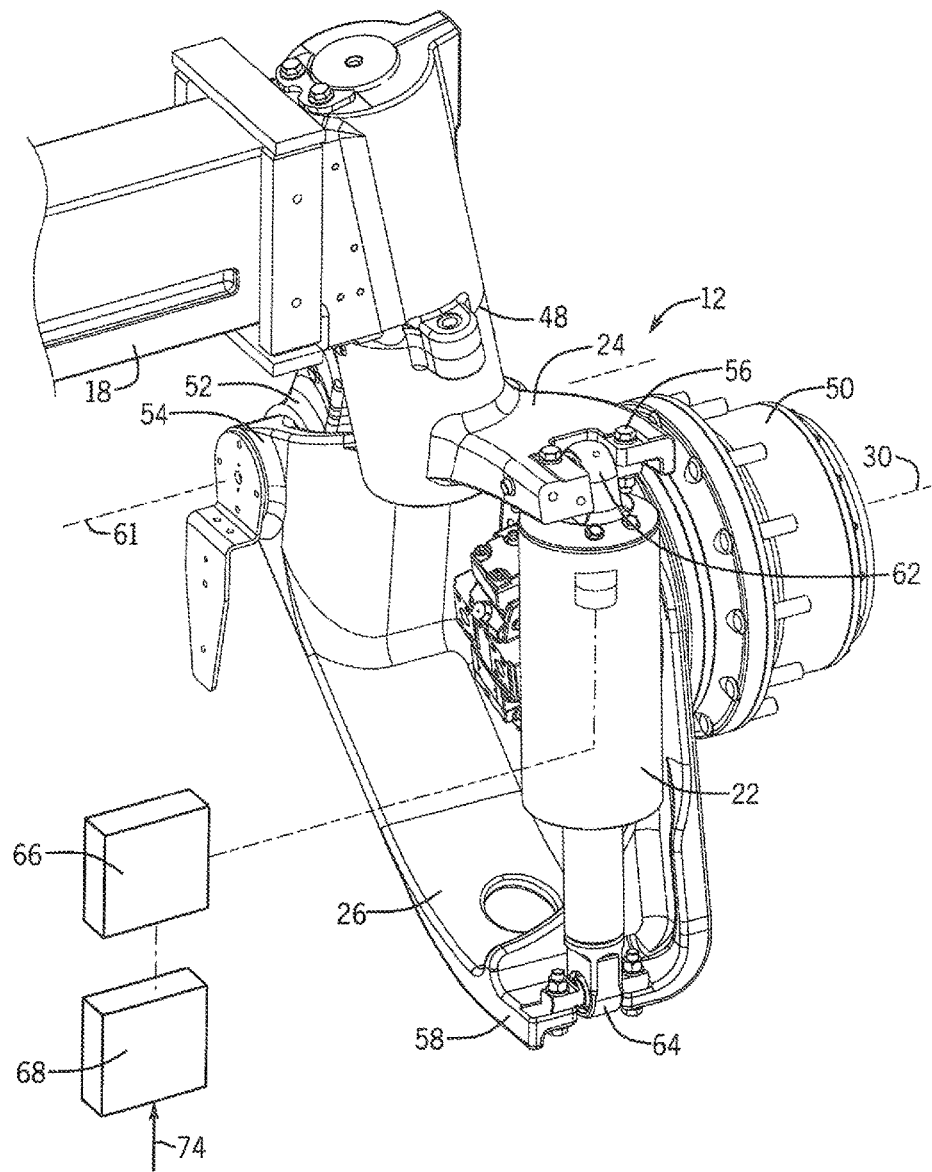
FIG. 4 is an assembled perspective illustration of the suspension system shown in FIG. 3.

FIGS. 3 and 4, illustrate the manner in which the lower suspension arm 26, the upper suspension arm 24, and the air strut 22, of the suspension system 12, are operatively interconnected to one another and disposed between the rolling axis 30 of the ground engaging wheel 14 and the frame 18, for supporting the applicator 10 above the ground surface 20.

The upper suspension arm 24 defines a frame attachment point 48 of the upper suspension arm 24, that is adapted for attachment to the frame 18. FIGS. 3 and 4 illustrate the suspension system 12 for the right rear wheel 12 of the applicator 10. In the exemplary embodiment of the applicator 10, the rear wheels 12 are not steerable, so the attachment points 48 of the rear suspension systems 12 are fixedly attached in a non-rotatable manner to the frame 18. Because the front wheels of the exemplary embodiment of the applicator 10 are steerable, the frame attachment points 48 for the front suspension systems 12 are attached to the frame in a manner that allows the upper suspension arms 22 of the front wheels to pivot about generally vertically extending steering axes (not shown) with respect to the frame 18, as part of a steering mechanism (not shown) of the applicator 10.

The lower suspension arm 26 defines the rolling axis 30 of the ground engaging wheel 12 and is adapted for supportive attachment, to the lower suspension arm 26, of the ground engaging wheel 12, for rotation of the ground engaging wheel 12 about the rolling axis 30 of the wheel 12. In the exemplary embodiment of the applicator 10, each of the four wheels of the applicator 12 is independently powered by a hydraulic motor unit 50 that is mounted on, and solely supported by the lower arm 26 of the suspension, for driving the wheel 12 about the rolling axis 30.

As further illustrated in FIGS. 3-5, the upper and lower suspension arms 24, 26 also each define respective forward 52, 54 and all 56, 58 ends of the suspension arms 24, 26. The forward ends 52, 54 of the upper and lower suspension arms 24, 26 are joined to one another by a knee pin 60, best seen in FIG. 3, to form a pivoting connection, that allows for pivoting movement of the lower arm 26 with respect to the upper arm 24 about a suspension pivot axis 61 that extends generally parallel to the rolling axis 30 of the wheel 12 and is located forward of the rolling axis 30 of the wheel 12. The aft ends 56, 58 of the upper and lower suspension arms 24, 26 are located respectively aft of the frame attachment point 48 and rolling axis 30, and are respectively adapted for connection to upper and lower ends 62, 64 of the air strut 22.

As shown schematically in FIG. 4, each of the air struts 22 in the suspension systems of the exemplary embodiment of the applicator 10 is configured for receiving a flow of pressurized air from an air power source 66, and for extending and retracting in response to the flow of pressurized air, to thereby respectively lower and raise the rolling axis 30 of the wheel 12 with respect to the frame attachment point 48, in the manner described above in relation to FIGS. 5-7.

The air struts 22 of the exemplary embodiments are air cylinders, each having an internal movable air piston, contained within a rigid cylinder, and connected to a piston rod of the cylinder. The movable piston and rigid walls of the cylinder form an internal air chamber 72 for receipt of the flow of pressurized air from the air power source 66. As pressurized air enters the internal air chamber, the air strut is urged to extend. And, conversely as pressurized air exits the internal chamber, the air strut retracts. Because the cylinder has rigid walls, it provides a substantially solid support at any extended length, and can be pressurized to hold a wide range of weights at the desired extended length. In essence, it will be understood that the air struts 22 of the exemplary embodiment of the invention have operating characteristics in which an effective spring rate of the air strut is remotely adjustable to provide a wide variety of desired operating heights, ride characteristics, and operating modes. This provides significant advantages in a trailing arm suspension system 12, according to the invention, over prior approached that used compression springs with fixed spring rates, and over prior systems that utilized air springs with flexible side walls which were limited to lower operating pressures.

As indicated in FIG. 3, the air struts 22 of the exemplary embodiment of the applicator 10 also include an integral hydraulic shock absorber 70, disposed in a linear relationship to the internal air chamber and piston arrangement 72. Other embodiments of the invention may not utilize such a shock absorber.

As will be understood from the forgoing description, the upper suspension arms 24 of the suspension systems 12 of the exemplary embodiment of the applicator 10, are rigid, and configured to not articulate vertically with respect to the frame 18. Furthermore, the forward end 52 of each of the upper suspension arms 24 is located both forward of and below the frame attachment point 48 for that upper suspension arm 24.

As illustrated in FIG. 4, a trailing-link suspension system 12, according to the invention, may further include an electronic control unit 68 that is operatively connected and configured for controlling the flow of pressurized air to the air strut 22 from the air power source 66, to thereby control extension and retraction of the air strut 22. An electronic control unit 68, according to the invention, may also be configured to receive an input signal 74 that is indicative of a desired height 16 of the frame 18 of the applicator 10 above the ground surface 16 beneath the applicator, and for controlling the air power source 66 in a manner causing the air strut 22 and suspension to support the frame 18 at the desired height 16. In the exemplary embodiment of the applicator 10, the air struts 22 in the suspension systems 12 of all four wheels 14 are controlled by one or more pressurized air sources 66, and one or more controllers 68, that may be cross linked or combined into a common air power source 66 and controller 68 for controlling the height of the frame 18.

The exemplary embodiment of the applicator 10 is operated using a method, in accordance with the invention, for controlling the height 16 of the frame 18 of the self-propelled agricultural product applicator 10 above a ground surface 20, by connecting the frame 18 to the four ground supporting wheels 14 of the applicator 12, using a trailing link suspension system 12 according to the invention at each wheel 14, and controlling a flow of pressurized air to the air struts 22 of the suspension systems 12, to thereby control extension of the air struts 22 and height 16 of the applicator frame 18 above the ground surface 20.

From the foregoing description, it will be apparent that the invention provides significant advantages over previous suspension systems, apparatuses and methods for high ground clearance, self-propelled, agricultural product applicators. The incorporation of the air strut into the suspension system allows the height of the applicator above the ground to be continuously controlled at a desired height, through regulation of the flow of pressurized air to the strut as product is dispensed.

In contrast to prior systems that utilized compression springs, the struts can be actively controlled to maintain a constant height, independent of the load that the applicator may be carrying at any given moment in time. In addition, the ride height may be selected and held for a given load, in a manner that was not possible with prior suspension systems that utilized compression springs or flexible-sided air springs.

A suspension system, according to the invention, also allows for height of the applicator to be selectively adjusted for special situations, such as transporting the applicator on a trailer or truck. By controlling the air struts to retract to their lowest position (see FIG. 7) even an unloaded applicator can be made to "squat" in a lowered position, to thereby reduce the overall height of the applicator and trailer or truck to facilitate movement of the applicator on public roadways.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. It is anticipated that skilled artisans may employ such variations as appropriate, and further anticipated that the invention may be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A trailing-arm suspension system for operatively connecting a ground engaging wheel to a frame of a self-propelled agricultural product applicator, where the frame is adapted for supporting at least one product container and defines forward and rear ends of the frame, a longitudinally extending central axis of the frame extending from the rear to the front of the frame in a direction of travel of the applicator, and a vertical axis of the frame, the suspension system comprising, an upper suspension arm, a lower suspension arm, and an air strut operatively interconnected to one another and disposed between the ground engaging wheel and the frame:

the upper suspension arm defining a frame attachment point thereof, adapted for fixed attachment to the frame;

the lower suspension arm defining a rolling axis of the ground engaging wheel and adapted for supportive attachment thereto of the ground engaging wheel for rotation of the ground engaging wheel about the rolling axis of the wheel;

the upper and lower suspension arms also defining respective forward and aft ends thereof, with the forward ends being adapted for operative pivoting connection to one another about a suspension pivot axis extending generally parallel to the rolling axis of the wheel and disposed forward of the rolling axis of the wheel, and the aft ends of the upper and lower suspension arms being disposed respectively aft of the frame attachment point and rolling axis, and with the aft ends of the upper and lower suspension arms being respectively adapted for operative attachment thereto of the air strut; and the air strut having an upper end thereof adapted for operative attachment to the aft end of the upper suspension arm, and also having a lower end thereof adapted for operative attachment to the aft end of the lower suspension arm;

with the air strut being configured for receiving a flow of pressurized air from an air power source, and for extending and retracting in response to the flow of pressurized air, to thereby respectively lower and raise the rolling axis of the wheel with respect to the frame attachment point.

2. The suspension system of claim 1, wherein the upper suspension arm is rigid, does not articulate vertically with respect to the frame, and the forward end of the upper suspension arm is disposed below the frame attachment point.

3. The suspension system of claim 1, wherein the suspension system provides sole support for the ground engaging wheel attached thereto.

4. The suspension system of claim 3 further comprising a hydraulic motor drive unit operatively attaching the wheel to the lower suspension arm.

5. The suspension system of claim 1, further including an electronic control unit operatively connected for controlling the flow of pressurized air to the air strut from the air power source, to thereby control extension and retraction of the air strut.

6. The suspension system of claim 5, wherein the electronic control unit is configured to receive an input signal indicative of a desired height of the frame of the applicator above a ground surface beneath the applicator, and for controlling the air power source in a manner causing the air strut to support the frame at the desired height.

7. The suspension system of claim 1, wherein the air strut further includes a shock absorber.

8. A self-propelled agricultural product applicator, having a ground engaging wheel operatively connected to a frame by a trailing-arm suspension system, with the frame being adapted for supporting at least one product container, the frame defining forward and rear ends of the frame, a longitudinally extending central axis of the frame extending from the rear to the front of the frame in a direction of travel of the applicator, and a vertical axis of the frame, and the suspension system comprises:

an upper suspension arm, a lower suspension arm, and an air strut which includes a shock absorber operatively interconnected to one another and disposed between the ground engaging wheel and the frame;

the upper suspension arm defining a frame attachment point thereof, adapted for fixed attachment to the frame;

the lower suspension arm defining a rolling axis of the ground engaging wheel and adapted for supportive attachment thereto of the ground engaging wheel for rotation of the ground engaging wheel about the rolling axis of the wheel;

the upper and lower suspension arms also defining respective forward and aft ends thereof, with the forward ends being adapted for operative pivoting connection to one another about a suspension pivot axis extending generally parallel to the rolling axis of the wheel and disposed forward of the rolling axis of the wheel, and the aft ends of the upper and lower suspension arms being disposed respectively aft of the frame attachment point and rolling axis, and with the aft ends of the upper and lower suspension arms being respectively adapted for operative attachment thereto of the air strut; and the air strut having an upper end thereof adapted for operative attachment to the aft end of the upper suspension arm, and also having a lower end thereof adapted for operative attachment to the aft end of the lower suspension arm;

with the air strut being configured for receiving a flow of pressurized air from an air power source, and for extending and retracting in response to the flow of pressurized air, to thereby respectively lower and raise the rolling axis of the wheel with respect to the frame attachment point.

9. The self-propelled agricultural product applicator of claim 8 having a two, or more, ground engaging wheels each operatively attached to the frame by individual trailing arm suspension systems comprising:

an upper suspension arm, a lower suspension arm, an air strut and a hydraulic motor drive unit operatively interconnected to one another and disposed between the ground engaging wheel and the frame for providing sole support of the ground engaging wheel respectively attached to that suspension system;

the upper suspension arm defining a frame attachment point thereof, adapted for fixed attachment to the frame, and being rigid and non-articulable vertically with respect to the frame, with the forward end of the upper suspension arm being disposed below the frame attachment point;

the lower suspension arm defining a rolling axis of the ground engaging wheel and adapted for supportive attachment thereto of the ground engaging wheel for rotation of the ground engaging wheel about the rolling axis of the wheel;

the upper and lower suspension arms also defining respective forward and aft ends thereof, with the forward ends being adapted for operative pivoting connection to one another about a suspension pivot axis extending generally parallel to the rolling axis of the wheel and disposed forward of the rolling axis of the wheel, and the aft ends of the upper and lower suspension arms being disposed respectively aft of the frame attachment point and rolling axis, and with the aft ends of the upper and lower suspension arms being respectively adapted for operative attachment thereto of the air strut;

the air strut having an upper end thereof adapted for operative attachment to the aft end of the upper suspension arm, and also having a lower end thereof adapted for operative attachment to the aft end of the lower suspension arm; and the air strut being configured for receiving a flow of pressurized air from an air power source, and for extending and retracting in response to the flow of pressurized air, to thereby respectively lower and raise the rolling axis of the wheel with respect to the frame attachment point.

10. The self-propelled agricultural product applicator of claim 9, further including an electronic control unit operatively connected for controlling the flow of pressurized air to the air struts of the suspension systems of the two, or more, ground engaging wheels from the air power source, to thereby control extension and retraction of the air struts.

11. The self-propelled agricultural product applicator of claim 10, wherein the electronic control unit is configured to receive an input signal indicative of a desired height of the frame of the applicator above a ground surface beneath the applicator, and for controlling the air power source in a manner causing the air struts of the suspension systems of the two, or more, ground engaging wheels to support the frame of the applicator at the desired height.

12. The self-propelled agricultural product applicator 8, wherein the upper suspension arm is rigid, does not articulate vertically with respect to the frame, and the forward end of the upper suspension arm is disposed below the frame attachment point.

13. The self-propelled agricultural product applicator of claim 8, wherein the suspension system provides sole support for the ground engaging wheel attached thereto.

14. The self-propelled agricultural product applicator of claim 13 further comprising a hydraulic motor drive unit operatively attaching the wheel to the lower suspension arm.

15. The self-propelled agricultural product applicator of claim 8, further including an electronic control unit operatively connected for controlling the flow of pressurized air to the air strut from the air power source, to thereby control extension and retraction of the air strut.

16. The self-propelled agricultural product applicator of claim 15, wherein the electronic control unit is configured to receive an input signal indicative of a desired height of the frame of the applicator above a ground surface beneath the applicator, and for controlling the air power source in a manner causing the air strut to support the frame at the desired height.

17. A method for controlling the height of a frame of a self-propelled agricultural product applicator above a ground surface, comprising the steps of:
   connecting the frame to a ground supporting wheel of the applicator using a trailing link suspension system including an upper suspension arm attached to the frame, a lower suspension arm providing sole support of a ground engaging wheel attached thereto, and an extensible air strut operatively interconnected between the upper and lower suspension arms; and
   controlling a flow of pressurized air to the air strut, to thereby control extension of the air strut and height of the applicator frame above the ground surface;
   wherein:
      the upper and lower suspension arms defining respective forward and aft ends thereof, with the forward ends being adapted for operative pivoting connection to one another about a suspension pivot axis extending generally parallel to and disposed forward of a rolling axis of the ground supporting wheel;
      the aft ends of the upper and lower suspension arms being disposed respectively aft of the rolling axis; and
      the aft ends of the upper and lower suspension arms being respectively adapted for operative attachment to the air strut.

18. The method of claim 17, further comprising connecting two or more ground engaging wheels of the applicator to the frame using individual trailing link suspension systems, each including an upper suspension arm attached to the frame, a lower suspension arm providing sole support of a ground engaging wheel attached thereto, and an extensible air strut operatively interconnected between the upper and lower arms, and controlling a flow of pressurized air to the air struts of the suspension systems, to thereby control respective extension of the air struts and height of the applicator frame above the ground surface.

19. A method for controlling the height of a frame of a self-propelled agricultural product applicator above a ground surface, comprising the steps of:
   connecting the frame to a ground supporting wheel of the applicator using a trailing link suspension system including an upper suspension arm attached to the frame, a lower suspension arm providing sole support of a ground engaging wheel attached thereto, and an extensible air strut operatively interconnected between the upper and lower suspension arms; and
   controlling a flow of pressurized air to the air strut, to thereby control extension of the air strut and height of the applicator frame above the ground surface wherein:
      the upper suspension arm defines a frame attachment point thereof, adapted for fixed attachment to the frame;
      the lower suspension arm defines a rolling axis of the ground engaging wheel and adapted for supportive attachment thereto of the ground engaging wheel for rotation of the ground engaging wheel about the rolling axis of the wheel;
      the upper and lower suspension arms also define respective forward and aft ends thereof, with the forward ends being adapted for operative pivoting connection to one another about a suspension pivot axis extending generally parallel to the rolling axis of the wheel and disposed forward of the rolling axis of the wheel, and the aft ends of the upper and lower suspension arms being disposed respectively aft of the frame attachment point and rolling axis, and with the aft ends of the upper and lower suspension arms being respectively adapted for operative attachment thereto of the air strut;
      the air strut has an upper end thereof adapted for operative attachment to the aft end of the upper suspension arm, and also has a lower end thereof adapted for operative attachment to the aft end of the lower suspension arm; and
      the air strut is configured for receiving a flow of pressurized air from an air power source, and for extending and retracting in response to the flow of pressurized air, to thereby respectively raise and lower the rolling axis of the wheel with respect to the frame attachment point.

\* \* \* \* \*